(12) United States Patent
Nakahara (10) Patent No.: US 8,520,243 B2
(45) Date of Patent: Aug. 27, 2013

(54) IMAGE FORMING APPARATUS, COMPUTER-READABLE RECORDING MEDIUM ON WHICH PRINT DATA PROCESSING PROGRAM CODE IS RECORDED, AND PRINT DATA PROCESSING METHOD

(75) Inventor: Hideo Nakahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 273 days.

(21) Appl. No.: 13/104,567

(22) Filed: May 10, 2011

(65) Prior Publication Data
US 2011/0273743 A1 Nov. 10, 2011

(30) Foreign Application Priority Data
May 10, 2010 (JP) .................................. 2010-108118

(51) Int. Cl.
G06F 3/12 (2006.01)
(52) U.S. Cl.
USPC ........................................ 358/1.15; 358/1.13
(58) Field of Classification Search
USPC ................................................. 358/1.1–1.9
See application file for complete search history.

(56) References Cited

U.S. PATENT DOCUMENTS

| 2004/0184072 A1* | 9/2004 | Jacobsen et al. ............. 358/1.15 |
| 2008/0018917 A1* | 1/2008 | Zhang ............................. 358/1.5 |
| 2010/0149598 A1* | 6/2010 | Shiohara ....................... 358/1.18 |

FOREIGN PATENT DOCUMENTS

| JP | 2001-243028 | 9/2001 |
| JP | 2004-348498 | 12/2004 |
| JP | 2005-346357 | 12/2005 |
| JP | 2006-235756 | 9/2006 |
| JP | 2008-026946 | 2/2008 |
| JP | 2010-009191 | 1/2010 |

* cited by examiner

*Primary Examiner* — King Poon
*Assistant Examiner* — Ibrahim Siddo
(74) *Attorney, Agent, or Firm* — McDonnell Boehnen Hulbert & Berghoff LLP (57) ABSTRACT

An image forming apparatus includes a data reception unit, a data analysis unit, and a print image generation unit. The data reception unit is configured to receive print data. The data analysis unit is configured to analyze the print data for each of a plurality of blocks, delete a block of a page that is not specified as a print target on the basis of print setting information included in the print data, and rearrange the blocks in a page order to be printed, in order to generate reconstructed print data. The print image generation unit is configured to generate print image data on the basis of the reconstructed print data.

13 Claims, 7 Drawing Sheets

| |
|---|
| DATA BLOCK<br>(DATA STRUCTURE INFORMATION OF ENTIRE PRINT DATA) |
| DATA BLOCK<br>(DATA STRUCTURE INFORMATION OF FIRST PAGE) |
| DATA BLOCK<br>(DATA STRUCTURE INFORMATION OF SECOND PAGE) |
| DATA BLOCK<br>(ONE PART OF PRINT DATA OF FIRST PAGE) |
| DATA BLOCK<br>(ANOTHER PART OF PRINT DATA OF FIRST PAGE) |
| DATA BLOCK<br>(ONE PART OF PRINT DATA OF SECOND PAGE) |
| DATA BLOCK<br>(IMAGE DATA OF FIRST PAGE) |
| DATA BLOCK<br>(YET ANOTHER PART OF PRINT DATA OF FIRST PAGE) |
| DATA BLOCK<br>(DATA UNNECESSARY FOR PRINTING) |
| DATA BLOCK<br>(IMAGE DATA OF SECOND PAGE) |
| DATA BLOCK<br>(PRINT SETTING INFORMATION) |

| | | |
|---|---|---|
| DATA BLOCK (DEFINITION INFORMATION OF FILE EXTENSION OF EACH DATA BLOCK) | ---------- | [Content_Types].xml |
| DATA BLOCK (LIST OF DOCUMENT(S) IN PRINT DATA) | ---------- | FixedDocSeq.fdseq |
| DATA BLOCK (LIST OF PAGE(S) IN DOCUMENT) | ---------- | FixedDoc.fdoc |
| DATA BLOCK (FILE FOR SPECIFYING FONT AND IMAGE N FIRST PAGE) | ---------- | 1.fpage.rels |
| DATA BLOCK (FILE FOR SPECIFYING FONT AND IMAGE IN SECOND PAGE) | ---------- | 2.fpage.rels |
| DATA BLOCK (IMAGE DATA FILE OF FIRST PAGE) | ---------- | 1.jpeg |
| DATA BLOCK (XML FORMAT FILE OF FIRST PAGE) | ---------- | 1.fpage |
| DATA BLOCK (FONT DATA FILE OF FIRST PAGE) | ---------- | font.odttf |
| DATA BLOCK (THUMBNAIL FILE) | ---------- | thumbnail.jpeg |
| DATA BLOCK (XML FORMAT FILE OF SECOND PAGE) | ---------- | 2.fpage |
| DATA BLOCK (PRINT SETTING INFORMATION) | ---------- | Job_PT.xml |

IMAGE FORMING APPARATUS, COMPUTER-READABLE RECORDING MEDIUM ON WHICH PRINT DATA PROCESSING PROGRAM CODE IS RECORDED, AND PRINT DATA PROCESSING METHOD

REFERENCE TO RELATED APPLICATIONS

This application is based upon and claims the benefit of priority from the corresponding Japanese Patent Application No. 2010-108118, filed in the Japan Patent Office on May 10, 2010, the entire contents of which is incorporated herein by reference.

BACKGROUND

1. Technical Field

The present disclosure relates to an image forming apparatus, a computer-readable recording medium on which a print data processing program code is recorded, and a print data processing method.

2. Description of the Related Art

A typical image forming apparatus receives print data from a host apparatus.

The host apparatus spools the print data once, divides the print data that has a large data size when the print data is to be sequentially transmitted to a printer, and sequentially deletes those data pieces whose prints have been completed.

The image forming apparatus processes the print data transmitted from the host apparatus by integrating the pieces of divided data in the image forming apparatus. To process the pieces of divided print data, the image forming apparatus consumes an amount of resources equivalent to normal (undivided) print data.

Alternatively, the host apparatus analyzes the print data and performs a reconstruction using data necessary for the printing to be transmitted to the printer. The analysis on the print data, the reconstruction, and the transmission are carried out in sequential processings instead of parallel processings.

At the time of the printing, if settings exist such as a number of copies of the print data and a sheet size, setting information is added to the print data after the reconstruction. The image forming apparatus analyzes the print data to obtain the setting information. For this reason, the analysis on the print data is redundantly carried out by both the host apparatus and the image forming apparatus.

In a case where the print data is constructed by a plurality of files like an XPS document format, the image forming apparatus expands files necessary for the print processing in sequence among compressed files to perform the printing. According to this configuration, since the files are not expanded all at once, a memory amount necessary for the data storage after the expansion may be reduced. However, as all the pieces of the received data are stored, memory is needed for spooling not only the compressed files used for the printing but also the compressed files that are not used for the printing.

SUMMARY

An image forming apparatus according to an embodiment of the present disclosure includes a data reception unit, a data analysis unit, and a print image generation unit. The data reception unit is configured to receive print data. The data analysis unit is configured to analyze the print data for each of a plurality of blocks, delete a block of a page that is not specified as a print target on the basis of print setting information included in the print data, and rearrange the blocks in a page order to be printed, in order to generate reconstructed print data. The print image generation unit is configured to generate print image data on the basis of the reconstructed print data.

A non-transitory computer-readable recording medium according to an embodiment of the present disclosure stores a print data processing program code executed by a computer of an image forming apparatus. The print data processing program code includes first to third sub-program codes. The first sub-program code causes the computer to receive print data. The second sub-program code causes the computer to analyze the print data for each of a plurality of blocks, delete a block of a page that is not specified as a print target on the basis of print setting information included in the print data, and rearrange the blocks in a page order to be printed, in order to generate reconstructed print data. The third sub-program code causes the computer to generate print image data on the basis of the reconstructed print data.

A print data processing method according to an embodiment of the present disclosure includes: (i) a reception unit receiving print data; (ii) a data analysis unit analyzing the print data for each of a plurality of blocks, deleting a block of a page that is not specified as a print target on the basis of print setting information included in the print data, and rearranging the blocks in a page order to be printed, in order to generate reconstructed print data; and (iii) a print image generation unit generating print image data on the basis of the reconstructed print data by a print image generation unit.

Additional features and advantages are described herein, and will be apparent from the following Detailed Description and the figures.

DETAILED DESCRIPTION

Hereinafter, embodiments of the present disclosure will be described on the basis of the drawings.

Figure 1:
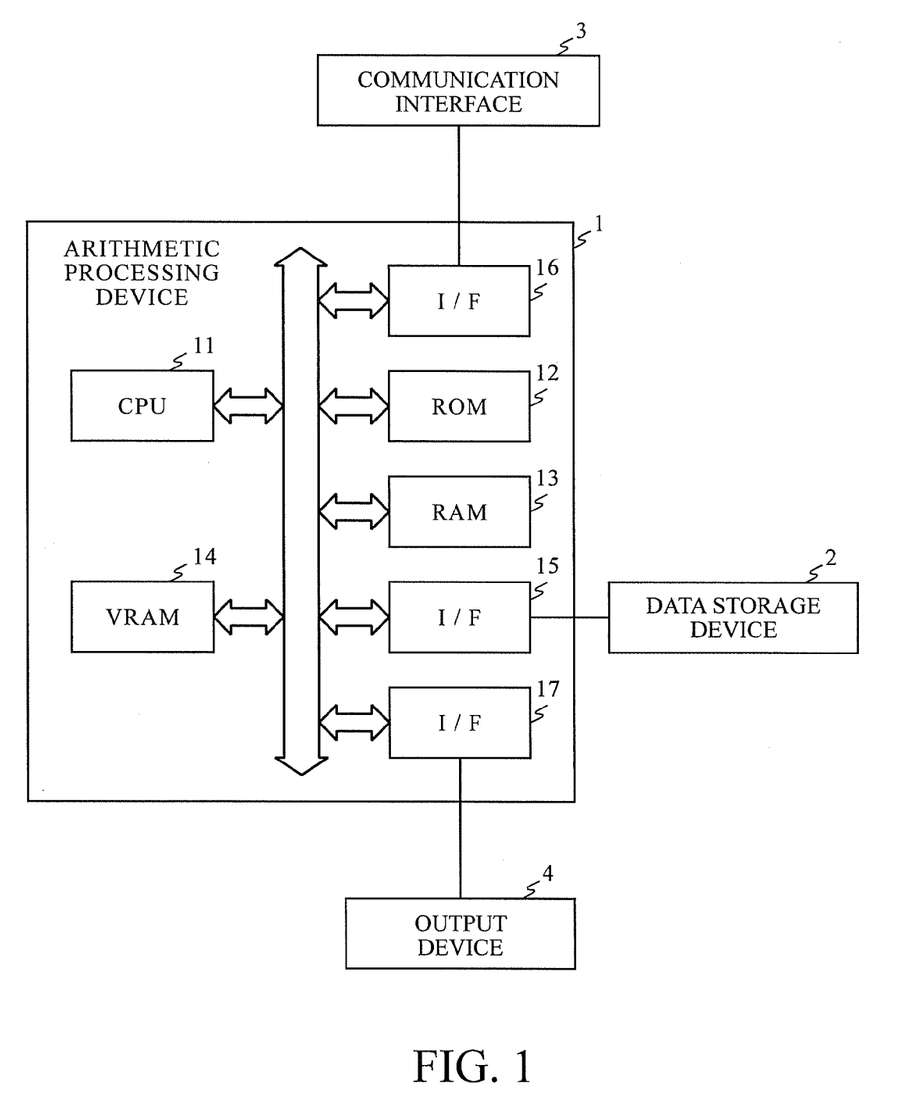
FIG. 1 illustrates a configuration of an image forming apparatus according to an embodiment of the present disclosure.

FIG. 1 illustrates a configuration of an image forming apparatus according to an embodiment of the present disclosure.

In FIG. 1, arithmetic processing device 1 is a computer that performs a processing while following a program code including a print processing program code. Arithmetic processing device 1 executes the program code to control an operation of the image forming apparatus.

Data storage device 2 is a storage having a recording medium on which the program code, data, and the like are recorded. For data storage device 2, a flash memory, a hard disk drive, or the like is used.

Communication interface 3 is a device that performs a data communication with an external apparatus. For communication interface 3, a peripheral device interface, a network interface, or the like is used.

Output device 4 is a device that outputs an image such as a printer or a display.

Arithmetic processing device 1 has CPU (Central Processing Unit) 11, ROM (Read Only Memory) 12, RAM (Random Access Memory) 13, VRAM (Video RAM) 14, and I/Fs (interfaces) 15 to 17 that can mutually perform a data communication via a bus or a controller.

CPU 11 is a processor that loads a program code including a print data processing program code stored in data storage device 2 or ROM 12 onto RAM 13, executes the program code, and performs a program described in the program code. ROM 12 is a non-volatile memory that stores the program code and data. RAM 13 is a memory that temporarily stores the program code and data when the program code is executed. RAM 13 is used also when the data processed by arithmetic processing device 1 is spooled.

VRAM 14 is a memory that stores color values of respective pixels in a drawing area corresponding to output device 4.

I/F 15 is an interface circuit that can connect data storage device 2. I/F 16 is an interface circuit that can connect communication interface 3. I/F 17 is an interface circuit that can connect output device 4.

Figure 2:
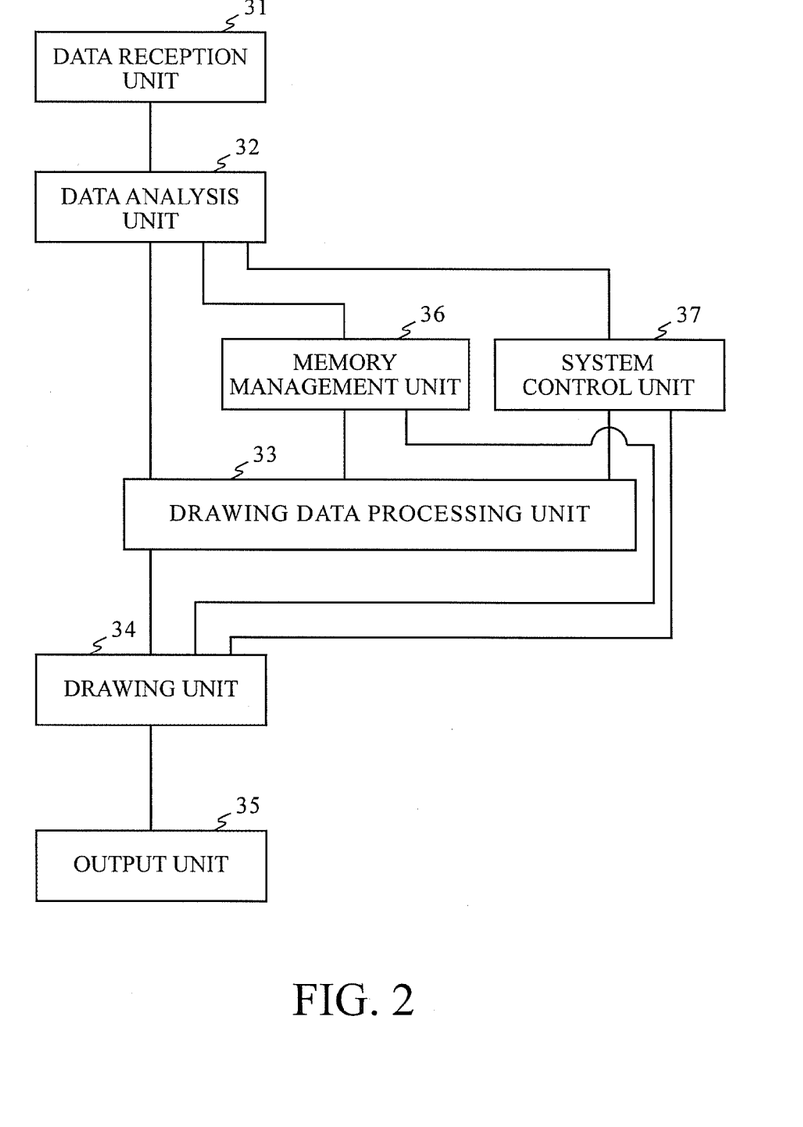
FIG. 2 illustrates a functional block diagram of the image forming apparatus according to the embodiment of the present disclosure.

FIG. 2 illustrates a functional block diagram of the image forming apparatus according to the present embodiment.

When the print data processing program code stored in the ROM or the data storage device is executed, arithmetic processing device 1 functions as data reception unit 31, data analysis unit 32, drawing data processing unit 33, drawing unit 34, output unit 35, memory management unit 36, and system control unit 37.

Data reception unit 31 performs a data communication with a device such as a host computer via communication interface 3.

Data analysis unit 32 analyzes the received data to extract a drawing command or the like. Data analysis unit 32 analyzes the print data for each of a plurality of data blocks to obtain data structure information and print setting information included in the print data. Data analysis unit 32 deletes a data block that is not used for printing and a data block of the data structure information on the basis of the data structure information. On the basis of the print setting information, data analysis unit 32 deletes a data block of a page that is not specified as a print target. After that, data analysis unit 32 rearranges the data blocks in the print data in a page order to be printed, in order to generate reconstructed print data.

The data structure information may represent documents included in the print data and pages included in the respective documents. If the print data is XPS (XML Paper Specification) data, the data structure information is included in "[Content_Types].xml", "rels/.rels", or the like. The data structure information is further included in another file specified in "[Content_Types].xml" and "_rels/.rels" such as, for example, "FixedDocSeq.fdseq".

If the print data is the XPS data, the print setting information is included in a print ticket named "~PT.xml". The print setting information specifies a number of copies to be printed, a sheet size, a page number of the print target, and the like.

Drawing data processing unit 33 causes drawing unit 34 to perform a drawing processing corresponding to the drawing command extracted by data analysis unit 32. On the basis of the drawing command, drawing data processing unit 33 generates a display list. On the basis of the display list generated by drawing data processing unit 33, drawing unit 34 generates a bitmap image. Drawing unit 34 writes the bitmap data into VRAM 14.

A pair comprising the drawing data processing unit 33 and drawing unit 34 functions as a print image generation unit that generates print image data constructed from the bitmap image on the basis of the print data processed by data analysis unit 32. The print image generation unit obtains the data structure information from data analysis unit 32 as specific parameter data (that is, binary data). The print image generation unit generates the print image data on the basis of the obtained specific parameter data and the reconstructed print data. The particular parameter data is an item described in the data block of the data structure information. If the data block is described in XPS, a parameter name is identified from a tag in the XPS element, and a parameter value is identified from a value of the XPS element.

Output unit 35 supplies the bitmap image in VRAM 14 to output device 4 to cause output device 4 to perform an image output (such as printing).

Memory management unit 36 manages the memory in the arithmetic processing device. System control unit 37 controls the respective units in the arithmetic processing device.

Next, the operation of the image forming apparatus according to the present embodiment, mainly, data analysis unit 32, will be described.

Figure 3:
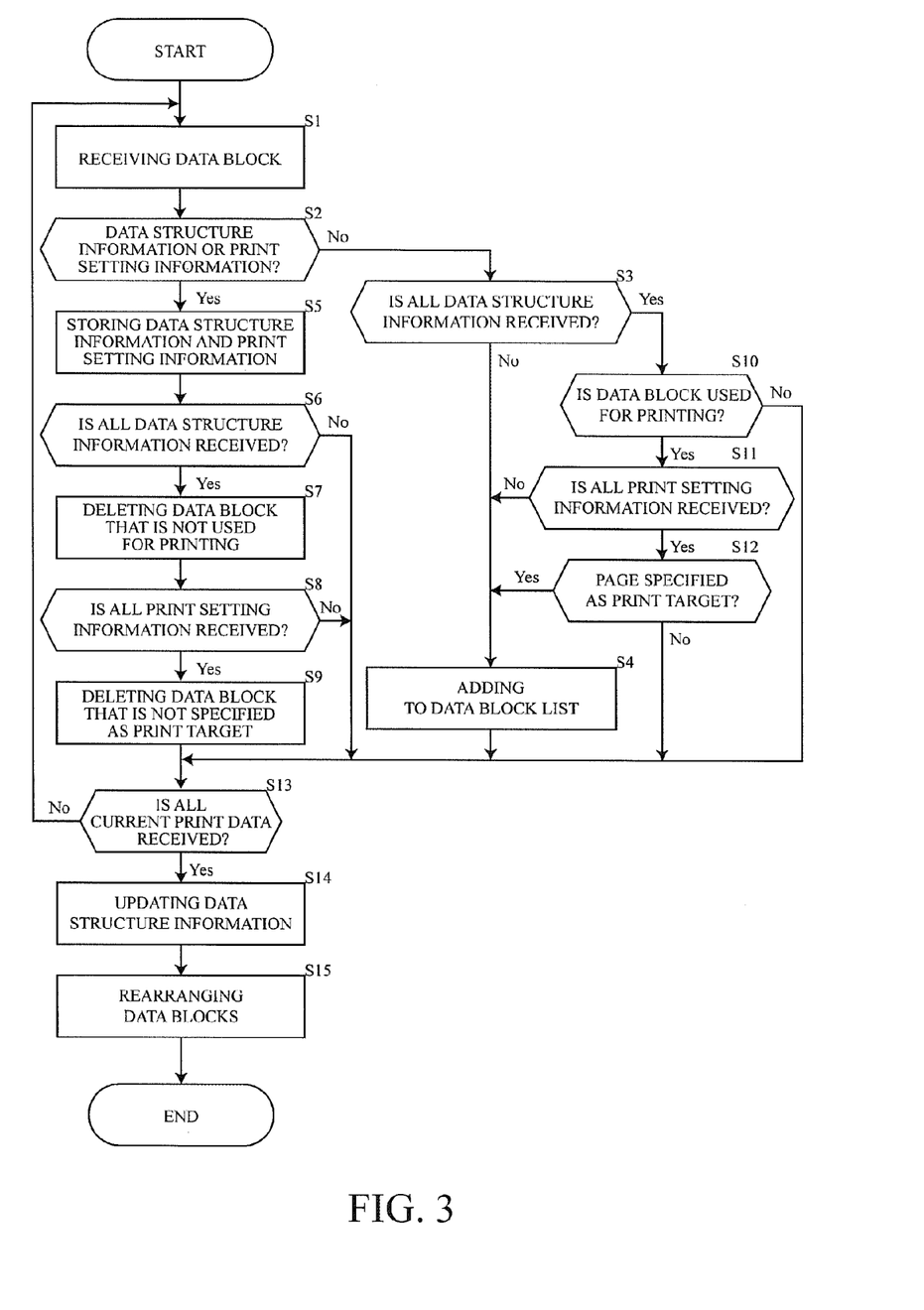
FIG. 3 illustrates a flow chart for describing an operation of a data analysis unit in the image forming apparatus according to the embodiment of the present disclosure.

FIG. 3 illustrates a flow chart for describing an operation of the data analysis unit in the image forming apparatus according to the present embodiment.

If the data reception unit receives the data block in the print data via the communication interface (step S1), the data analysis unit determines whether or not the received data block corresponds to either the data structure information or the print setting information (step S2).

At this time, if the current print data is the XPS data, the XPS is composed of one ZIP file and contains a plurality of files as the data block. Among these files, files such as "[Content_Types].xml", "FixedDocSeq.fdseq", "FixedDoc.fdoc", and "1.fpage.rels" are determined as the data block of the data structure information. Also, the file named "~PT.xml" is determined as the data block of the print setting information.

If the received data block is not the data block of either the data structure information or the print setting information, the data analysis unit determines whether or not all the pieces of the data structure information with regard to the current print data are received (step S3).

If some data structure information is not received with regard to the current print data, the data analysis unit spools the received data block in RAM to be added to a data block list in the RAM (step S4). At this time point, since not all the pieces of the data structure information are known, the following two items are not yet determined: (1) whether or not the received data block is necessary for the printing and (2) an optimal arrangement position of the data block. Therefore, the received data block is spooled once in the RAM.

On the other hand, if the received data block is the data block of either the data structure information or the print setting information (step S2), the data analysis unit analyzes the received data block to obtain the data structure information or the print setting information. The data analysis unit obtains the data structure information as specific parameter data used for the processing in the print image generation unit. The data analysis unit stores the obtained specific parameter data in the RAM together with the already received data structure information and print setting information (step S5). The data analysis unit deletes the analyzed data block. Then, the data analysis unit determines whether or not all the pieces of the data structure information with regard to the current print data are received (step S6).

If all the pieces of the data structure information with regard to the current print data are received, the data analysis unit identifies the data block that is not used for the printing among the data blocks spooled in the RAM. Then the data analysis unit deletes the identified data block from the RAM on the basis of the specific parameter data with regard to the data structure information stored in the RAM (step S7). Furthermore, the data analysis unit determines whether or not all the pieces of the print setting information with regard to the current print data are received (step S8). Then, if all the pieces of the print setting information are received, on the basis of the specific parameter data with regard to the print setting information stored in the RAM, the data analysis unit identifies the data block that is not specified as the print target among the data blocks spooled in the RAM. The data analysis unit deletes the identified data block from the RAM (step S9). If the data structure information that is not received with regard to the current print data exists, the data analysis unit does not perform the processings in steps S7 to S9. To elaborate, when all the pieces of the data structure information with regard to the current print data become apparent, the unnecessary data block is deleted. Also, once all the pieces of the data structure information are received and all the pieces of the print setting information are received, (from among the data blocks spooled in the RAM) the data block of the page that is not specified as the print target on the basis of the print setting information is deleted from the RAM.

Also, when a data block other than the data structure information and the print setting information is received (step S2: No), if the data blocks of all the pieces of the data structure information are already received (step S3: Yes), the data analysis unit verifies the received data block. To be more specific, the data analysis unit determines whether or not the received data block is to be used for the printing on the basis of the specific parameter data with regard to the data structure information stored in the RAM (step S10). If the received data block is not to be used for the printing, the received data block is not spooled in the RAM and is not added to the data block list.

If the received data block is to be used for the printing, the data analysis unit determines whether or not the reception of the data blocks of all the pieces of the print setting information is completed (step S11). If the reception of the data blocks of all the pieces of the print setting information is not completed, the data analysis unit spools the received data block in the RAM. Then the data analysis unit adds the received data block to the data block list in the RAM (step S4). On the other hand, if the data blocks of all the pieces of the print setting information are received, the data analysis unit determines whether or not the received data block corresponds to the page specified as the print target on the basis of the specific parameter data with regard to the print setting information stored in the RAM (step S12). If the received data block corresponds to a block of the page specified as the print target, the data analysis unit spools the received data block in the RAM. Then the data analysis unit adds the received data block to the data block list in the RAM (step S4). On the other hand, if the received data block does not correspond to the page specified as the print target, the received data block is not spooled in the RAM and is not added to the data block list.

In this manner, for each of the data blocks of the current print data, the processings in steps S1 to S12 are performed. The data analysis unit determines whether or not all the pieces of the current print data are received (step S13). If all the data blocks are not received, the data analysis unit performs the processings in steps S1 to S12 with regard to the subsequent data block.

If all the pieces of the current print data are received, the data analysis unit updates the content of the data structure information to optimize the arrangement order of the data blocks with respect to the subsequent processing (step S14). The data analysis unit rearranges the data blocks to generate reconstructed print data on the basis of the updated data structure information (step S15). The data analysis unit stores the updated data structure information, that is, the data structure information of the reconstructed print data in the RAM as the specific parameter data. Also, the data analysis unit stores the content of the print setting information in the RAM as the specific parameter data. Furthermore, the data analysis unit stores the reconstructed print data composed of the data blocks after the rearrangement in the data storage device. The reconstructed print data is composed of the data blocks used for the printing and specified as the print target and does not include the other data structure information, print setting information, and the like.

Figure 4:
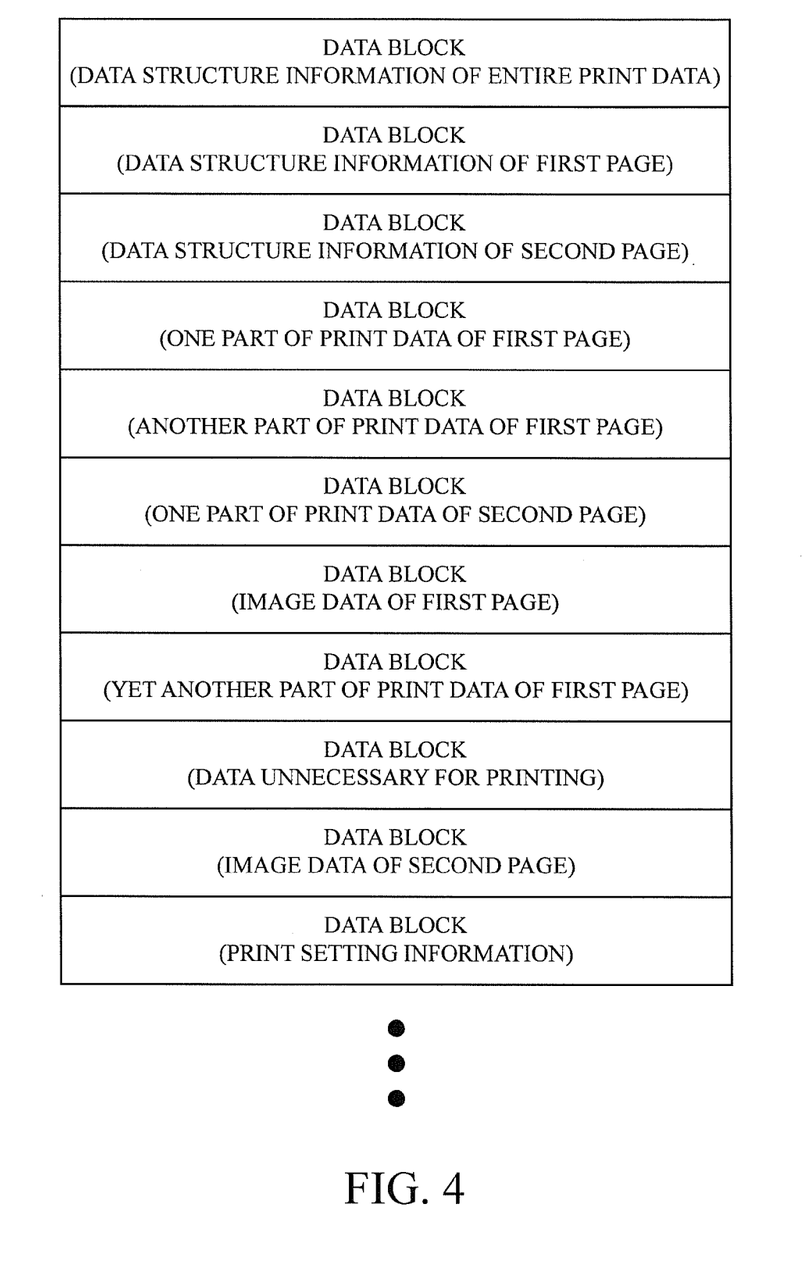
FIG. 4 illustrates a configuration example of print data received by the image forming apparatus according to the embodiment of the present disclosure.
Figure 5:
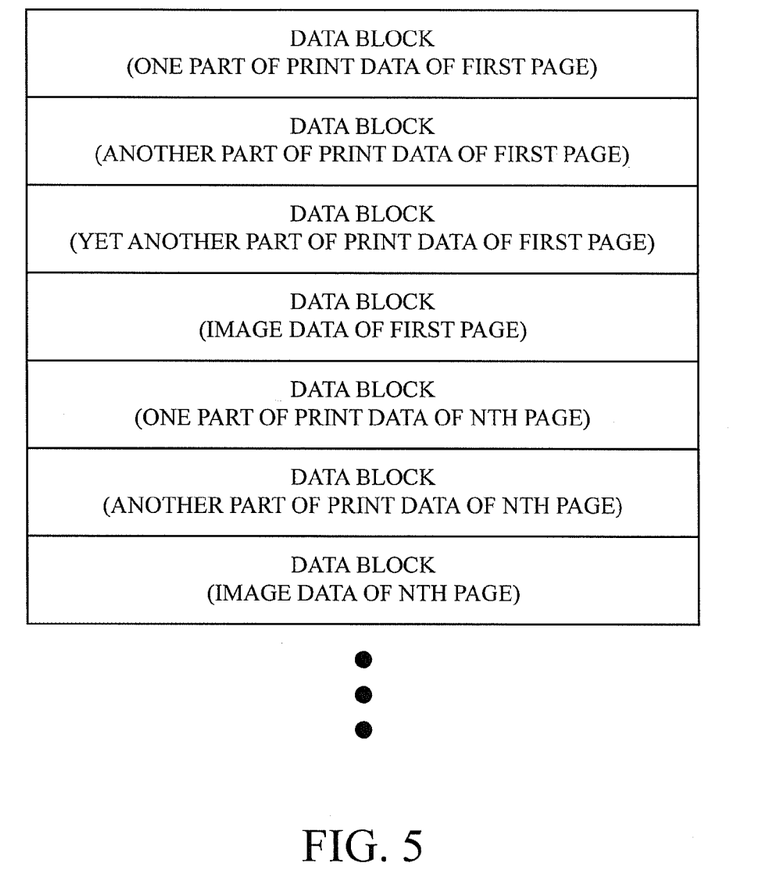
FIG. 5 illustrates a configuration example of reconstructed print data generated from the print data illustrated in FIG. 4.

FIG. 4 illustrates a configuration example of print data received by the image forming apparatus according to the present embodiment. FIG. 5 illustrates a configuration example of reconstructed print data generated from the print data illustrated in FIG. 4.

As illustrated in FIG. 4, the print data is composed of data structure information, printing data for each page, print setting information, and one or more data blocks corresponding to data unnecessary for the printing. The data unnecessary for the printing refers, for example, to data such as a thumbnail image that is used for a preview but is not used for an output of the print data itself. In the print data illustrated in FIG. 4, as the data structure information specifies the data blocks included in the print data, the arrangement order of the data blocks is not in an orderly manner. Also, in the print data illustrated in FIG. 4, the data structure information has a hierarchical structure composed of the data structure information with regard to the entire print data and the data structure information on the respective pages.

The reconstructed print data illustrated in FIG. 5 is generated from the print data illustrated in FIG. 4. At that time, the remaining data blocks other than the data block that is not necessary for the printing, the data block of the page that is not specified as the print target, the data structure information, and the print setting information are rearranged in a page order to be printed. In FIG. 5, after a data block of a first page, a data block of an nth page is arranged. If a second page is specified by the print setting information as the print target, n=2 is set. If the second page is not specified as the print target and a third page is specified as the print target, n=3 is set.

Figure 6:
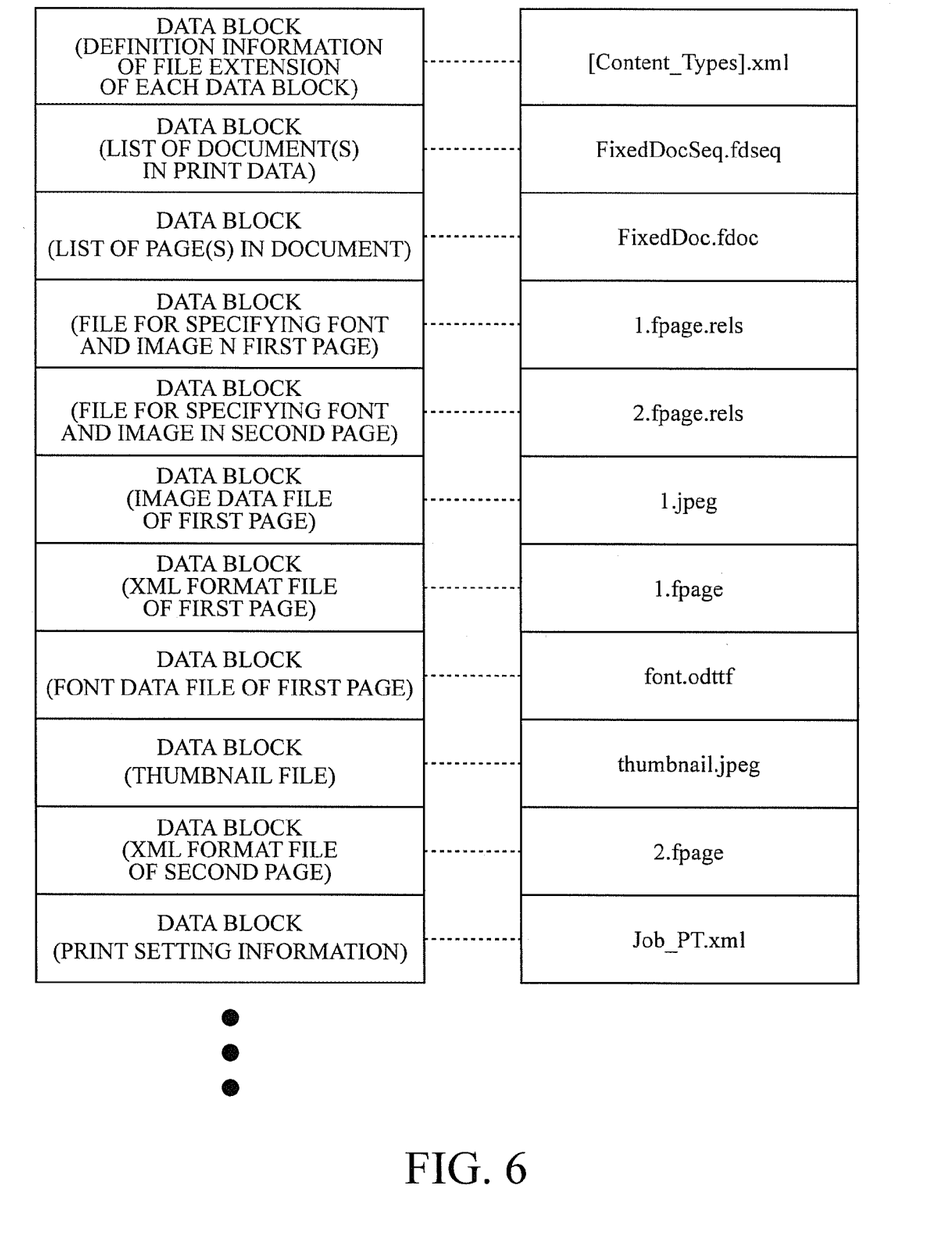
FIG. 6 illustrates a configuration example of XPS print data received by the image forming apparatus according to the embodiment of the present disclosure.
Figure 7:
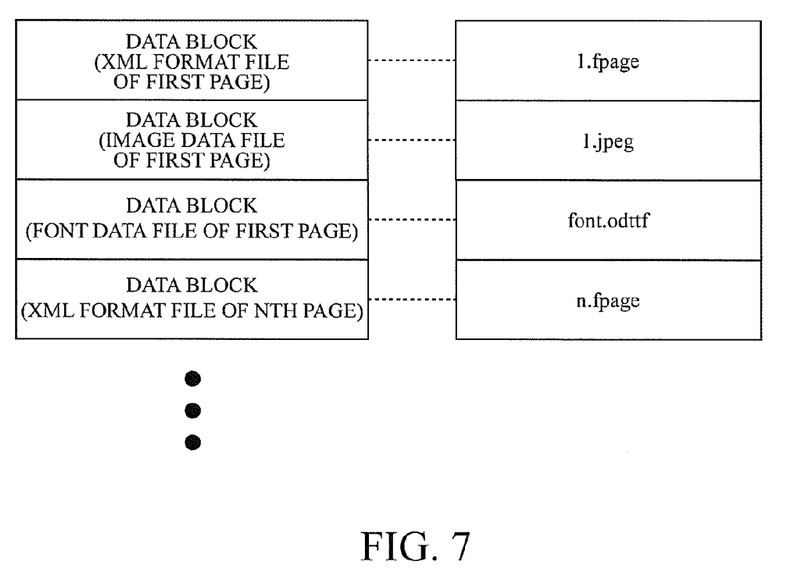
FIG. 7 illustrates a configuration example of print data reconstructed from the print data illustrated in FIG. 6.

FIG. 6 illustrates a configuration example of print data in the XPS document format that is received by the image forming apparatus according to the present embodiment. FIG. 7 illustrates an exemplary data configuration of the reconstructed print data generated from the print data illustrated in FIG. 6.

In XPS print data illustrated in FIG. 6, "[Content_Types].xml", "FixedDocSeq.fdseq", "FixedDoc.fdoc", and "i.fpage.rels" (i denotes a page number, i=1, . . . ) of the respective pages are the data structure information. "[Content_Types].xml" is a file including a definition of a file extension of each data block. "FixedDocSeq.fdseq" is a file including a list of one or a plurality of documents included in the print data (herein, "FixedDoc.fdoc" is included as a document). "FixedDoc.fdoc" is a file including a list of one or a plurality of pages included in this document. "i.fpage.rels" is a file for specifying a font, an image file, and the like used in a page i. Also, as data blocks other than the data structure information, the print data illustrated in FIG. 6 has the following. "i.fpage" is a file describing a content of the page i in XML (Extensible Markup Language). "1.jpeg" is an image data file used in the first page. "font.odttf" is a font data file used in the first page. "Job_PT.xml" is a print ticket file of the print setting information. "thumbnail.jpg" is a thumbnail file that is not used for the printing. These files are included in a ZIP file in conformance with a specification of the XPS document format. Paths in the print data (ZIP file) of the above-mentioned respective files are "/[Content_Types].xml", "/FixedDocSeq.fdseq", "/Documents/j/FixedDoc.fdoc" (a j-th document), "/Documents/j/Pages/_rels/i.fpage.rels" (an i-th page of the j-th document), "/Documents/j/Pages/i.fpage" (the i-th page of the j-th document), "/Resources/font.odttf", "/Metadata/Job_PT.xml", and "/docProps/thumbnail.jpg".

Reconstructed print data illustrated in FIG. 7 is generated from the print data illustrated in FIG. 6. At that time, the remaining data blocks ("i.fpage", "1.jpeg", "font.odttf", and "n.fpage") other than the data block of the thumbnail image that is unnecessary for the printing ("thumbnail.jpg"), the data block of the second page that is not specified as the print target ("i.fpage"), the data structure information ("[Content_Types].xml", "FixedDocSeq.fdseq", "FixedDoc.fdoc", and "i.fpage.rels"), and the print setting information ("Job_PT.xml") are rearranged in a page order to be printed.

While referring to the data structure information (the specific parameter data) stored in the RAM, the print image generation unit generates print image data from the print data obtained by rearranging the data blocks. The output unit controls the output device to perform the image output (such as the printing) on the basis of the generated print image data.

According to this configuration, the print image generation unit can refrain from analyzing the print data again and obtaining the data structure information. Therefore it is possible to increase the processing speed for the print data.

With the image forming apparatus according to the present embodiment, in the pre-processing at the time of spooling, the data block of the page that is not specified as the print target is deleted, and the data blocks are rearranged in the order suitable to the subsequent data processing. Therefore it is possible to increase the speed of the subsequent data processing while the resources, such as memory, are conserved.

It should be noted that the above-mentioned embodiment is an example of the present disclosure, but the present disclosure is not limited to these, and various modifications and alterations can be made without departing from the gist of the present disclosure.

For example, according to the above-mentioned embodiment, the print data may also be in a format other than the XPS data.

Also, according to the above-mentioned embodiment, even before the rearrangement, the data block that does not include the data structure information may be spooled in the data storage device instead of the RAM.

The present disclosure can be applied, for example, to an image forming apparatus such as a printer.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
a data reception unit configured to receive print data;
a data analysis unit configured to analyze the print data for each of a plurality of blocks, delete a block of a page that is not specified as a print target on the basis of print setting information included in the print data, and rearrange the blocks in a page order to be printed, in order to generate reconstructed print data; and
a print image generation unit configured to generate print image data on the basis of the reconstructed print data,
wherein the data analysis unit is further configured to:
analyze the print data for each of the blocks,
delete the block that is not used for a printing and the block of data structure information on the basis of data structure information included in the print data,
delete the block of the page that is not specified as the print target and the block of the print setting information on the basis of the print setting information, and
generate the reconstructed print data by rearranging the blocks in the page order to be printed,
wherein the data reception unit is further configured to store the block of the received print data in a memory,
wherein the data analysis unit is further configured to:
delete the block that is not used for the printing and the block of the data structure information from the memory on the basis of the data structure information and store the data structure information in the memory as specific parameter data when all the pieces of the data structure information included in the print data are obtained,
delete the block of the page that is not specified as the print target and the block of the print setting information from the memory on the basis of the print setting information when all the pieces of the print setting information included in the print data are obtained, and
store the reconstructed print data generated by rearranging the blocks generated by rearranging in a storage, and
wherein the print image generation unit is further configured to read out the data structure information from the memory as the specific parameter data, read out the reconstructed print data from the storage, and generate the print image data on the basis of the specific parameter data and the reconstructed print data.

2. The image forming apparatus according to claim 1, wherein the data reception unit is further configured to store the block of the received print data in a memory, and
wherein the data analysis unit is further configured to delete the block of the page that is not specified as the print target from the memory on the basis of the print setting information when all the pieces of the print setting information included in the print data are obtained.

3. The image forming apparatus according to claim 2, wherein with regard to the block received after all the pieces of the print setting information included in the print data are obtained, the data analysis unit is further configured to delete the block of the page that is not specified as the print target on the basis of the print setting information, without storing the block in the memory.

4. The image forming apparatus according to claim 1, wherein with regard to the block received after all the pieces of the data structure information included in the print data are received, the data analysis unit is further configured to delete the block that is not used for the printing on the basis of the data structure information, without storing the block in the memory.

5. The image forming apparatus according to claim 1, wherein with regard to the block received after all the pieces of the print setting information included in the print data are obtained, the data analysis unit is further configured to delete the block of the page that is not specified as the print target on the basis of the print setting information, without storing the block in the memory.

6. The image forming apparatus according to claim 1, wherein the data structure information is information representing documents included in the print data and the pages included in the respective documents.

7. The image forming apparatus according to claim 1, wherein the print data is XPS data, and the block is a file in the XPS data.

8. The image forming apparatus according to claim 1, further comprising an output unit configured to print using the print image data.

9. A non-transitory computer-readable recording medium that stores a print data processing program code executed by a computer of an image forming apparatus, the print data processing program code comprising:
   a first sub-program code for causing the computer to receive print data
   a second sub-program code for causing the computer to analyze the print data for each of a plurality of blocks, delete a block of a page that is not specified as a print target on the basis of print setting information included in the print data, and rearrange the blocks in a page order to be printed, in order to generate reconstructed print data; and
   a third sub-program code for causing the computer to generate print image data on the basis of the reconstructed print data,
   wherein the second sub-program code further causes the computer to:
   (a) analyze the print data for each of the blocks,
   (b) delete the block that is not used for a printing and the data structure information on the basis of data structure information included in the block of the print data,
   (c) delete the block of the page that is not specified as the print target and the block of the print setting information on the basis of the print setting information, and
   (d) rearrange the blocks in the page order to be printed, in order to generate the reconstructed print data,
   wherein the first sub-program code further causes the computer to store the block of the received print data in a memory,
   wherein the second sub-program code further causes the computer to:
   (a) delete the block that is not used for the printing and the block of the data structure information from the memory on the basis of the data structure information and store the data structure information in the memory as the specific parameter data when all the pieces of the data structure information included in the print data are obtained,
   (b) delete the block of the page that is not specified as the print target and the block of the print setting information from the memory on the basis of the print setting information when all the pieces of the print setting information included in the print data are obtained,
   (c) with regard to the block received after all the pieces of the data structure information included in the print data are obtained, delete the block that is not used for the printing on the basis of the data structure information, without storing the block in the memory,
   (d) with regard to the block received after all the pieces of the print setting information included in the print data are obtained, delete the block of the page that is not specified as the print target in the memory on the basis of the print setting information, without storing the block in the memory, and
   (e) store the reconstructed print data generated by rearranging the blocks in a storage, and
   wherein the third sub-program code further causes the computer to read out the data structure information from the memory as the specific parameter data, read out the reconstructed print data from the storage, and generate print image data on the basis of the specific parameter data and the reconstructed print data.

10. The computer-readable recording medium according to claim 9,
   wherein the first sub-program code further causes the computer to store the block of the received print data in a memory, and
   wherein the second sub-program code further causes the computer to:
   (a) delete the block of the page that is not specified as the print target from the memory on the basis of the print setting information when all the pieces of the print setting information included in the print data are obtained, and
   (b) with regard to the block received after all the pieces of the print setting information included in the print data are obtained, delete the block of the page that is not specified as the print target on the basis of the print setting information, without storing the block in the memory.

11. A print data processing method comprising:
   a reception unit receiving print data:
   a data analysis unit analyzing the print data for each of a plurality of blocks, deleting a block of a page that is not specified as a print target on the basis of print setting information included in the print data, and rearranging the blocks in a page order to be printed, in order to generate reconstructed print data;
   a print image generation unit generating print image data on the basis of the reconstructed print data;
   the data analysis unit analyzing the print data for each of the blocks;
   the data analysis unit deleting the block that is not used for a printing and the block of the data structure information on the basis of the data structure information included in the print data;
   the data analysis unit deleting the block of the page that is not specified as the print target and the block of the print setting information on the basis of the print setting information;
   the data analysis unit rearranging the blocks in the page order to be printed, in order to generate the reconstructed print data;
   the data reception unit storing the block of the received print data in a memory;
   the data analysis unit deleting the block that is not used for the printing and the block of the data structure information from the memory on the basis of the data structure information and storing the data structure information in the memory as the specific parameter data when all the pieces of the data structure information included in the print data are obtained;

the data analysis unit deleting the block of the page that is not specified as the print target and the block of the print setting information from the memory on the basis of the print setting information when all the pieces of the print setting information included in the print data are obtained;

with regard to the block received after all the pieces of the data structure information included in the print data are received, the data analysis unit deleting the block that is not used for the printing on the basis of the data structure information, without storing the block in the memory;

with regard to the block received after all the pieces of the print setting information included in the print data are obtained, the data analysis unit deleting the block of the page that is not specified as the print target on the basis of the print setting information, without storing the block in the memory;

the data analysis unit storing the reconstructed print data generated by rearranging the blocks in a storage; and the print image generation unit reading out the data structure information from the memory as the specific parameter data, reading out the reconstructed print data from the storage, and generating print image data on the basis of the specific parameter data and the reconstructed print data.

12. The print data processing method according to claim 11, further comprising:

the data reception unit storing the block of the received print data in a memory;

the data analysis unit deleting the block of the page that is not specified as the print target from the memory on the basis of the print setting information when all the pieces of the print setting information included in the print data are obtained; and with regard to the block received after all the pieces of the print setting information included in the print data are obtained, the data analysis unit deleting the block of the page that is not specified as the print target on the basis of the print setting information, without storing the block in the memory.

13. The print data processing method according to claim 11, further comprising an output unit performing printing using the print image data.

* * * * *